(12) United States Patent
Ellison et al.

(10) Patent No.: US 7,243,231 B2
(45) Date of Patent: Jul. 10, 2007

(54) SENSORY VERIFICATION OF SHARED DATA

(75) Inventors: Carl M. Ellison, Portland, OR (US); Stephen H. Dohrmann, Hillsboro, OR (US); Edward C. Epp, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 10/210,341

(22) Filed: Jul. 31, 2002

(65) Prior Publication Data

US 2004/0025017 A1 Feb. 5, 2004

(51) Int. Cl.
*H04L 9/00* (2006.01)

(52) U.S. Cl. ............................ 713/168; 713/161; 726/2

(58) Field of Classification Search ................ 713/161, 713/168
See application file for complete search history.

(56) References Cited

U.S. PATENT DOCUMENTS

| 5,224,160 A | 6/1993 | Paulini et al. |
| 5,425,020 A | 6/1995 | Gregg et al. |

(Continued)

FOREIGN PATENT DOCUMENTS

| EP | 1128597 | 8/2001 |

| WO | WO 9849855 A2 * 11/1998 |

(Continued)

OTHER PUBLICATIONS

Diffie, Whitfield and Hellman, M., "New Directions in Cryptography," IEEE Transactions on Information Theory, Nov. 1976, pp. 644-654, vol. IT-22(6).
Rivest, R., "SDSI—A Simple Distributed Security Infrastructure," Sep. 15, 1996, Laboratory for Computer Science, Massachusetts Institute of Technology, http://theory.lcs.mit.edu/~rivest/sdsi10.html, pp. 1-41.
Housley, R., et al., Internet X.509 Public Key Infrastructure Certificate and CRL Profile, Jan. 1999, Request for Comments: 2459, www.ieft.org/rfc/ref2459.txt. pp. 1-113.
Ellison, C., et al., "SPKI Certificate Theory," Sep. 1999, Network Working Group, RFC 2693, www.ietf.org/rfc/rfc2693.txt.pp. 1-38.
Menes, A.J., Oorschot Van, P.C., Vanstone, S.A.: "Handbook of Applied Cryptography", 1997, CRC, Press, Boca Raton XP002266634.
Frisch, A.: "Email Security That's Good Enough" RS/Magazine 'Online! Feb. 1997, pp. 16-20, XP002266633 <URL:http://swexpert.com/C5/RS.C2.FEB.97.pdf> 'retrieved on Feb. 12, 2004!.

*Primary Examiner*—Gilberto Barron
*Assistant Examiner*—Samson Lemma
(74) *Attorney, Agent, or Firm*—Blakely, Sokoloff, Taylor & Zafman LLP (57) ABSTRACT

In one embodiment, a method for sensory verification comprises exchanging at least one data item with a computing unit and selecting a sequence number. Such selection may be accomplished by generation of the sequence number or manual entry by the user. Thereafter, a transformation is periodically performed on the data item, the sequence number and optionally a random value to produce a sequence of values, each value being used to produce a perceivable sensory element for comparison with another sensory element produced by another computing unit.

26 Claims, 5 Drawing Sheets

U.S. PATENT DOCUMENTS

| | | |
|---|---|---|
| 5,530,757 A | 6/1996 | Krawczyk |
| 5,596,641 A * | 1/1997 | Ohashi et al. ............... 380/248 |
| 5,889,861 A | 3/1999 | Ohashi et al. |
| 5,940,513 A | 8/1999 | Aucsmith et al. |
| 6,131,162 A | 10/2000 | Yoshiura et al. |
| 6,216,004 B1 | 4/2001 | Tiedemann et al. |
| 6,430,608 B1 | 8/2002 | Shaio |
| 6,553,029 B1 | 4/2003 | Alexander |
| 6,601,172 B1 | 7/2003 | Epstein |
| 6,661,810 B1 | 12/2003 | Skelly et al. |
| 6,664,969 B1 | 12/2003 | Emerson et al. |
| 6,694,434 B1 * | 2/2004 | McGee et al. ............... 713/189 |
| 6,741,852 B1 * | 5/2004 | Mohrs ........................ 455/411 |
| 6,804,506 B1 * | 10/2004 | Freitag et al. ............... 455/411 |
| 6,996,273 B2 * | 2/2006 | Mihcak et al. ............... 382/181 |
| 2001/0016909 A1 | 8/2001 | Gehrmann |
| 2003/0014637 A1 * | 1/2003 | Ellison et al. ............... 713/178 |

* cited by examiner

SENSORY VERIFICATION OF SHARED DATA

FIELD

Embodiments of this invention relate to the field of data security involving sensory verification of shared data, in particular, the verification technique of shared data through visual or auditory processes.

GENERAL BACKGROUND

As electronic computing units proliferate, the demand for applications to facilitate communications between such devices will also increase. These devices can be personal digital assistants (PDAs) as an example, or personal computers or laptop computers or any other devices capable of storing, processing and communicating information. With the use of these devices, one person may want to share stored data items with one or more other persons. These stored data items may be of any size, from a single bit to the entire stored contents of the PDA.

If the data transfer is conducted over unsecured network connections, the transferred data items need to be verified for accuracy and completeness. One reason for such verification is that the data items may have been accidentally corrupted or maliciously tampered with during transmission. This verification is especially important if the datum has security value.

Currently, after one participant (sender) provides data to another participant (recipient), the participants typically must trust that the transfer was correct, because methods of verification are difficult to obtain and execute. In some cases, a cryptographic hash application is available on all computing devices engaged in this data verification, and the participants may compute the cryptographic hash over the shared data and then read the alphanumeric value of the hash to one another.

For example, an application program referred to as "Pretty Good Privacy" (PGP) exemplifies a data verification technique for cryptographic keys. The idea of PGP is to bind a public key of an owner to his or her global name, such as an e-mail address, for example, without the cost of a central trusted source. PGP allows every user to generate his or her own keys. For key verification purposes, PGP computes a fingerprint of the key to be verified, in the form of a cryptographic hash result of that key. This hash result is computed independently by the sender's (keyholder's) copy of PGP and the recipient's copy of PGP. These cryptographic hash results, displayed either in the form of a long hexadecimal number or a sequence of English words, are then compared by having one party read the value to the other. If the values match, then the key in question is verified.

The PGP verification technique has a number of disadvantages. For instance, PGP is exclusively used for key verification and not for verification of data items as a whole. Another disadvantage associated with PGP verification requires many hexadecimal numbers or a string of meaningless words to be compared, which is a time consuming and unpleasant method for those who want to achieve a high reliability of verification. As a result, some users skip the verification process entirely. Also, PGP verification is unable to verify multiple persons contemporaneously and fails to provide a rendition of images or audible sounds for verification of data items. This method of verification is also available by computer applications that verify arbitrary files, one at a time, by computing their cryptographic hash values, rendering those hash values as alphanumeric strings and allowing one user to read out the string while another user or set of users compare what is read to what their own machines have computed.

BRIEF DESCRIPTION OF THE DRAWINGS

The invention may best be understood by referring to the following description and accompanying drawings that are used to illustrate embodiments of the invention.

DETAILED DESCRIPTION

Certain embodiments of the invention relate to a computing unit and method for shared data verification through successive visual and/or auditory operations so that data held by multiple persons or computing units can be verified contemporaneously. Examples of visual and/or auditory operations include presentation of sensory elements in order to determine that exchanged data items were accurately and completely received. Such presentation includes, but is not limited or restricted to (i) graphical display of different images or alphanumeric characters in succession, (ii) play back of audible sounds in succession such as musical notes, chords or pronounceable syllables, (iii) play back of audible impulses such as white noise, and the like.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

Herein, a "computing unit" may generally be considered as hardware, software, firmware or any combination thereof that is configured to process information and enable data items to be presented to and perceived by the user. Some illustrative examples of a computing unit include a computer (e.g., laptop, hand held such as personal digital assistant "PDA", etc.), a wireless telephone handset, alphanumeric pager or any other portable communication device.

When the computing unit is implemented with software, such software features a plurality of software modules, each being instructions or code that, when executed, perform certain functions. The software is stored in a machine-readable medium, which is any medium that can store or is considered statutory. Examples of "machine-readable medium" include, but are not limited or restricted to a programmable electronic circuit, a semiconductor memory device, a volatile memory (e.g., random access memory, etc.), a non-volatile memory (e.g., read-only memory, flash memory, etc.), a floppy diskette, an optical disk such as a compact disk (CD) or digital versatile disc (DVD), a hard drive disk, or the like.

In addition, a "data item" is a collection of bits which can be stored in machine-readable medium. For instance, the data item may be a cryptographic public key associated with a participant or uniquely assigned to his or her computing unit. As another example, the data item may be a root key certificate, a file, or an electronic message. A "nonce" is a random sequence of bits internally generated by a source of randomness such as a pseudo random number generator or random number generator for example. In general, a "sensory element" is any rendering of generated or selected data that can be perceived directly by the senses, including an image (static or moving); a sound or sequence of sounds; letters, words or syllables to be read with the eyes or perceived with the ears; etc. This might also include, in the future, renderings to be perceived by the sense of touch (including temperature) or taste.

Figure 1:
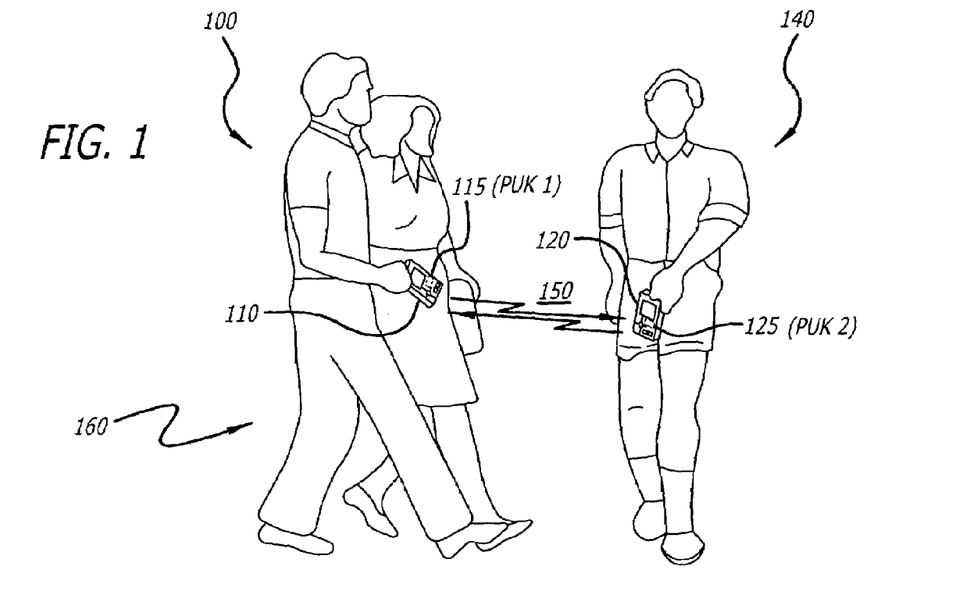
FIG. 1 is an exemplary embodiment of two parties that are performing operations in accordance with one embodiment of the data verification technique.

Referring now to FIG. 1, an exemplary embodiment of two parties that are performing operations in accordance with one embodiment of the data verification technique is shown. Herein, a first participant (sender) 100 is in close physical proximity to a second participant (receiver) 140. This allows a sender's computing unit 110 to communicate with a receiver's computing unit 120 over a link 150. As shown, link 150 is any communication pathway over a wired/wireless information-carrying medium (e.g., electrical wire, optical fiber, cable, bus, radio frequency "RF", infrared "IR" or another wireless communication scheme such as Bluetooth™, past or future Institute of Electrical and Electronics Engineers (IEEE) 802.11 standards published Nov. 16, 1998 and entitled "Wireless LAN Medium Access Control (MAC) and Physical Layer (PHY) specifications" or any future related standards.

As generally shown, computing unit 110 stores one or more data items in machine readable medium. For this embodiment, one data item might be a cryptographic public key (PUK1) 115 uniquely associated with sender 100 or computing unit 110 of sender 100. Similarly, computing unit 120 stores one or more data items such as a cryptographic public key (PUK2) 125 that differs from PUK1 115 for example.

Figure 3:
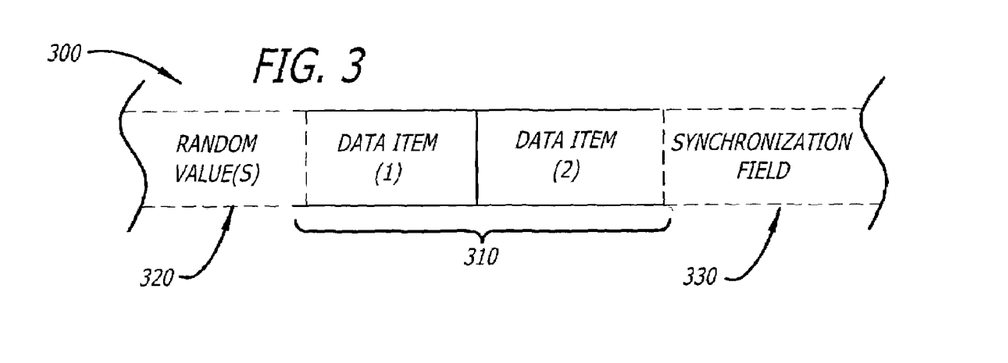
FIG. 3 is an exemplary embodiment of a data structure of a verification packet used for data verification.

For this embodiment of the invention, computing unit 110 is capable of (transmitting (e.g., broadcast) a verification packet 300 of FIG. 3, which includes at least one data item (e.g., PUK1), to all other computing units that are able to receive the broadcast information. The verification packet 300 may further include a random value such as a nonce. When the broadcast is conducted over a wireless medium, all computing units within a specific geographic area 160 and tuned into a certain frequency may receive verification packet 300 from computing unit 110. However, when the broadcast is conducted over a wired medium, all computing units coupled directly or indirectly to the wired medium may receive verification packet 300 from computing unit 110. In the situation where the wired medium is the Internet, any computing unit having access to the Internet may receive verification packet 300 of FIG. 3.

It is contemplated that another embodiment of computing unit 110 may be configured with connection oriented transmission capability, not broadcast capability. Thus, computing unit 110 can only communicate and transfer data items to one computing unit at a time.

Figure 2:
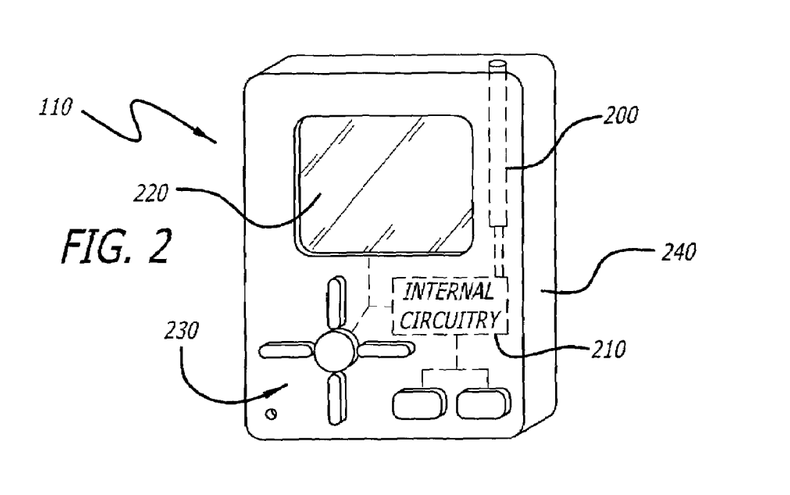
FIG. 2 is an exemplary embodiment of a computing unit in which one embodiment of the invention can be practiced.

Referring now to FIG. 2, an illustrative embodiment of one of the computing units (e.g., computing unit 110) is shown. For illustrative purposes, computing unit 110 comprises an input/output (I/O) interface 200, internal circuitry 210, a display screen 220 and a keypad 230 being an integral part of a casing 240. Casing 240 is made of an inflexible material such as hardened plastic, and thus, protects internal circuitry 210 from damage and contaminants.

More specifically, I/O interface 200 operates as a transceiver to support the reception and/or transmission of data items. In one embodiment, as shown, I/O interface 200 may be implemented as an antenna and transceiver logic for transmitting and/or receiving verification packets as RF-based signals. Of course, other embodiments of I/O interface 200 may include, but are not limited or restricted to a wired or wireless modem, a light emitting diode (LED) transmitter and/or receiver to transfer data through light pulses, and the like.

As further shown in FIG. 2, internal circuitry 210 enables sensory verification of shared data by controlling the operations of I/O interface 200 and display screen 220. Examples of internal circuitry 210 include one or more of the following: processor (e.g., microprocessor, application specific integrated circuit, digital signal processor, microcontroller, etc.), memory (nonvolatile or volatile), combinatorial logic and clock circuitry.

Internal circuitry 210 is configured to control the extraction of data items from verification packets transmitted from another computing unit. These data items may be stored within the computing unit. Internal circuitry 210 may further control the display of sensory elements on display screen 220, the selection of these sensory elements being based on the recovered data items. For instance, in one embodiment of the invention, internal circuitry 210 may execute a transformation function to process data items, perhaps in combination with other data, and compute indices to memory locations. The indices are used to retrieve sensory elements stored in the memory locations. Examples of the transformation function include a one-way hash function (e.g., SHA-1, SHA1-HMAC) or an Exclusive OR (XOR) function.

As shown, display screen 220 is a flat panel screen (e.g., liquid crystal display or plasma display) although any type of display screen may be used. While display screen 220 may be used as an output device in one embodiment, it is contemplated that display screen 220 may be implemented as a touch screen display, thereby operating as an I/O device. For that embodiment of the invention, keypad 230 may be removed.

Alternatively, it is contemplated that computing unit 110 may be implemented with any input component or combination of components that would allow persons to visually perceive the presentation of images or hear the play back of audible sound. For instance, although computing unit 110 is shown with display screen 220, it is contemplated that it may be implemented with speakers to provide an audio interface in addition to or in lieu of display screen 220. This would allow presentation of audible sounds being associated with data items. Similarly, computing unit 110 may be implemented with a tactile device to allow one to compare successively produced patterns by placement of a hand on both computing units 110 and 120.

Referring now to FIG. 3, an exemplary embodiment of a data structure for verification packet 300 used for sensory verification is illustrated. As shown for this embodiment, verification packet 300 is transmitted from one computing unit to another. For illustrative purposes, verification packet 300 as shown is transmitted from computing unit 110.

For this embodiment of the invention, verification packet 300 includes a plurality of fields; namely, a data field 310, an optional nonce field 320 and an optional synchronization field 330. Data field 310 contains one or more data items to be transferred between the computing units. For example, one data item may be a cryptographic public key (PUK1) associated with the sender or associated with the computing unit used by the sender. PUK1 corresponds to a private key (PRK1) held and controlled by the sender or his/her computing unit. Of course, the data items may also be software (e.g., application, applet or any segment of code), a table of sensory elements or any data to assist in the presentation of sensory elements. It may also be some function, such as a cryptographic hash, of some data element, or a plurality of such elements.

Nonce field 320 contains one or more random values (nonce) produced within computing unit 110. Synchronization field 330 contains a value used to synchronize multiple computing units. For instance, the value may include the time at which verification packet 300 is formed at computing unit 110. Alternatively, synchronization field 330 may include a sequence number that is to be incremented or decremented in response to actual completion of an event (e.g., pushing a button of keypad 230 of FIG. 2). As subsequent verification packets are formed and transmitted, the contents of both nonce field 320 and synchronization field 330 are not constant and will vary.

In lieu of a single verification packet 300, it is contemplated that multiple packets may be transmitted and each packet carrying content within one or more fields of packet 300. For example, one packet may carry the nonce. Another packet may carry data. Another packet may carry the synchronization data. Also, the transmission need not be in the same protocol or even over the same delivery mechanism. One field may be transferred over IR, another over wireless, one over FTP over wired Internet, one by a CD ROM, etc.

I. Mutual Sensory Verification of Shared Data

For this embodiment of the invention, two or more computing units are adapted to exchange at least one data item. As an optional feature, during a data transfer, the data item(s) may be accompanied by one or more random values. Or, stated another way, one or more of these data items can be random values. After the data transfer has completed, a combination of a sequence number (or time value), data item(s) exchanged by the computing units and any optional random value(s) is available on more than one computing unit and is processed by a transformation function on each of the computing units where it is expected to be available. This produces a result, which is used for conducting sensory verification by displaying or playing back a sensory element associated with the result.

The transformations are performed in succession upon changing the sequence number. This change may be clock controlled (clock-driven) or manually controlled by the participant (manually-driven). Exemplary scenarios of controlled alteration of the sequence number includes (1) a sequence number that is incremented by a clock (at some interval), (2) a sequence number that is incremented by some human action (envision the clock that chess players use, handing play off to one another), and (3) a clock value itself (at some agreed-upon interval, when the clock value ==0 modulo that interval).

Figure 4:
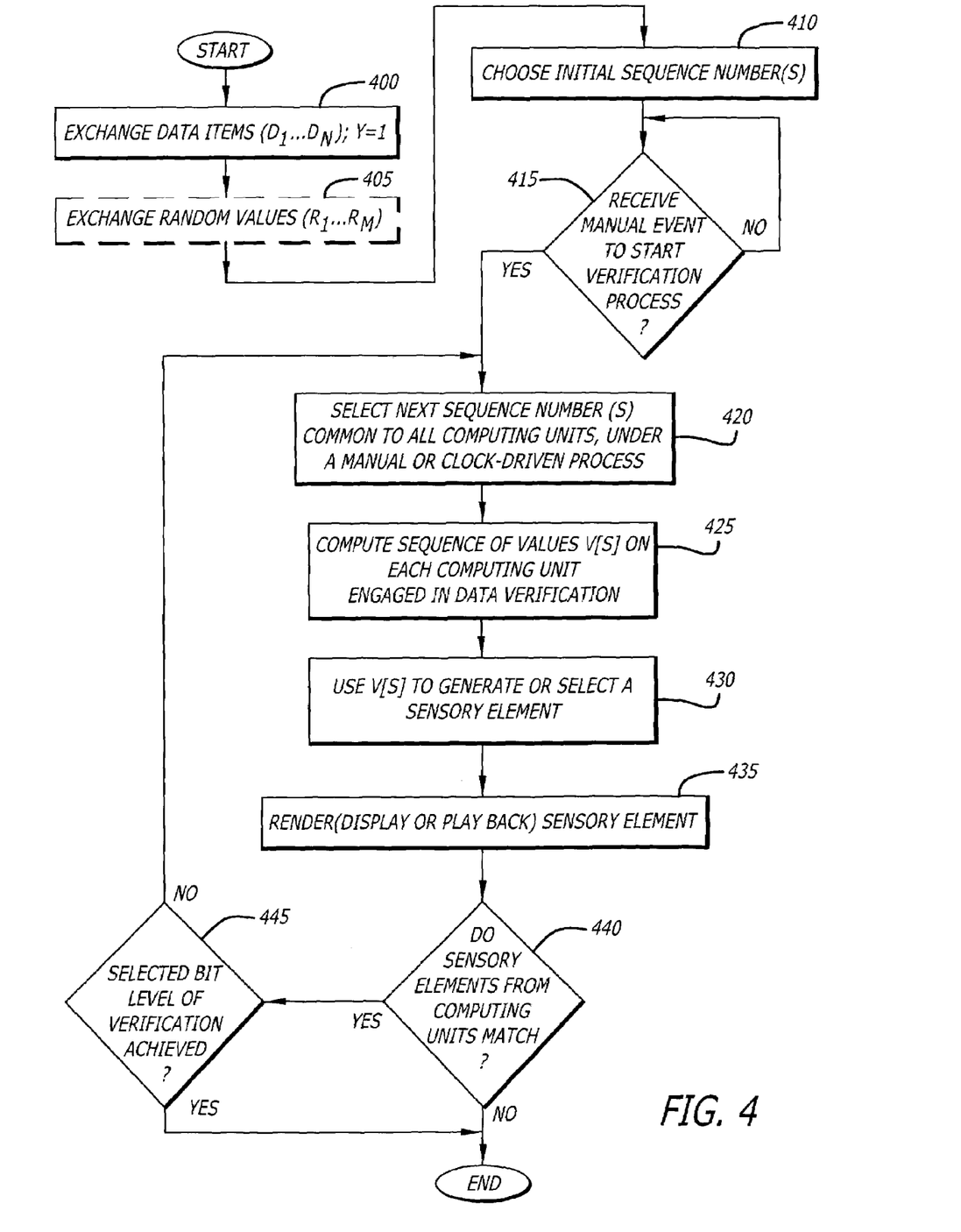
FIG. 4 is an exemplary embodiment of a flowchart outlining the operations performed in accordance with a clock-driven or manually-driven, mutual sensory verification technique.

More specifically, as described in FIG. 4, an exemplary embodiment of a flowchart outlining the operations performed in accordance with a clock-driven or manually-driven, mutual sensory verification technique of shared data is shown.

Initially, there is an exchange of one or more data items ($D_1 \ldots D_N$), and optionally one or more random values ($R_1 \ldots R_M$) between participants (blocks 400 and 405). The random values ($R_1 \ldots R_M$) may correspond with the number of data items (M=N) or may differ in number. The random values ($R_1 \ldots R_M$) can be used to mitigate the chances of a successful attack for those computing units that have internal sources of randomness. During or subsequent to the exchange, an initial sequence number(s) is chosen and, in order to start the verification process, a manual event should take place (blocks 410 and 415). The manual event may be depression of a button, selection of a menu item being displayed and the like.

Thereafter, a next sequence number(s) is selected, which is common to all of the computing units (block 420). This selection may be agreed upon by the participants and manually entered into the computing unit by each participant or exchanged from one computing unit via the verification packet. Alternatively, this selection may be conducted by internally generating a sequence number by one of the computing units and exchanging that number with the other computing units via the verification packet. Thereafter, each participant is able to produce the same sequence of values (v[s]) represented as in equation (1) and used for sensory element retrieval as set forth in FIGS. 6A and 6B below (block 425).

$$v[s]=H(s, D_1 \ldots D_N, R_1 \ldots R_M), \text{ where } N \geq 1 \text{ and } M \geq 0 \quad (1)$$

For the production of the sequence values under a clock-driven process, each sequence value v[s] is computed in response to internal clocking of the computing unit started by an event or at an agreed-upon time. The production of the sequence values occurs after completion of contemporaneous actions by the participants themselves (e.g., depressing key of a keypad).

For instance, for one embodiment of the invention, each sequence value v[s] may be a result of a hash function based on a particular sequence number (s) along with the exchanged data items ($D_1 \ldots D_N$) and optional random values ($R_1 \ldots R_M$). The sequence value v[s] is subsequently used to generate or select a series of sensory elements (e.g., words, tones, chords, images, etc.) as describes in block 430. The sensory elements are then tendered (displayed or played back) as described in block 435.

The displayed or played back sensory elements from the computing units are compared (block 440). During verification of the sequence of values, using certain functions H ( ), one learns progressively more about the data item being verified with each value. This amount of knowledge about the shared data can be expressed in units of bits, as an information theoretic measure. If a selected bit level of verification has not yet been achieved, a new sequence value is generated at the computing units and corresponding sensory elements are displayed or played back for verification (block 445). As an approximation, one can assume a constant number of bits learned with each computed sample and sensory comparison. If that number of bits is "K", then if samples are computed at a rate of "Y" samples per second, one is achieving an information comparison rate of roughly Y×K bits per second.

As an optional feature, a progress bar, indexed in bits of verification, can be displayed on the display screen of the computing unit. That is, if the display or play back of the value v[s], achieves B bits of sensory comparison, a participant would learn roughly B new bits about the data item being verified with each value. This is generally true as long as the total number of bits verified is much less than the size of the data item. As that total approaches the size of the data item, less is learned with each new value. The actual amount learned with the rendering of each additional sample, v[s], depends on the nature of the function, H( ), used to compute v[s] and on the perceptual abilities of the person doing the comparison. These are subjects to be determined, on a case by case basis, via experimental psychology methods. However, given that each repeated v[s] contributes some number of bits b[s] to total verification, the progress bar can show the sum of these b[s] values from when verification started. The high end of the progress bar can be set at what the designer believes to be adequate for security of the application. For example, if one believes that 90 bits is strong enough for verification, one could display a progress bar whose 100% value is equal to 90 bits of verification.

Figure 5:
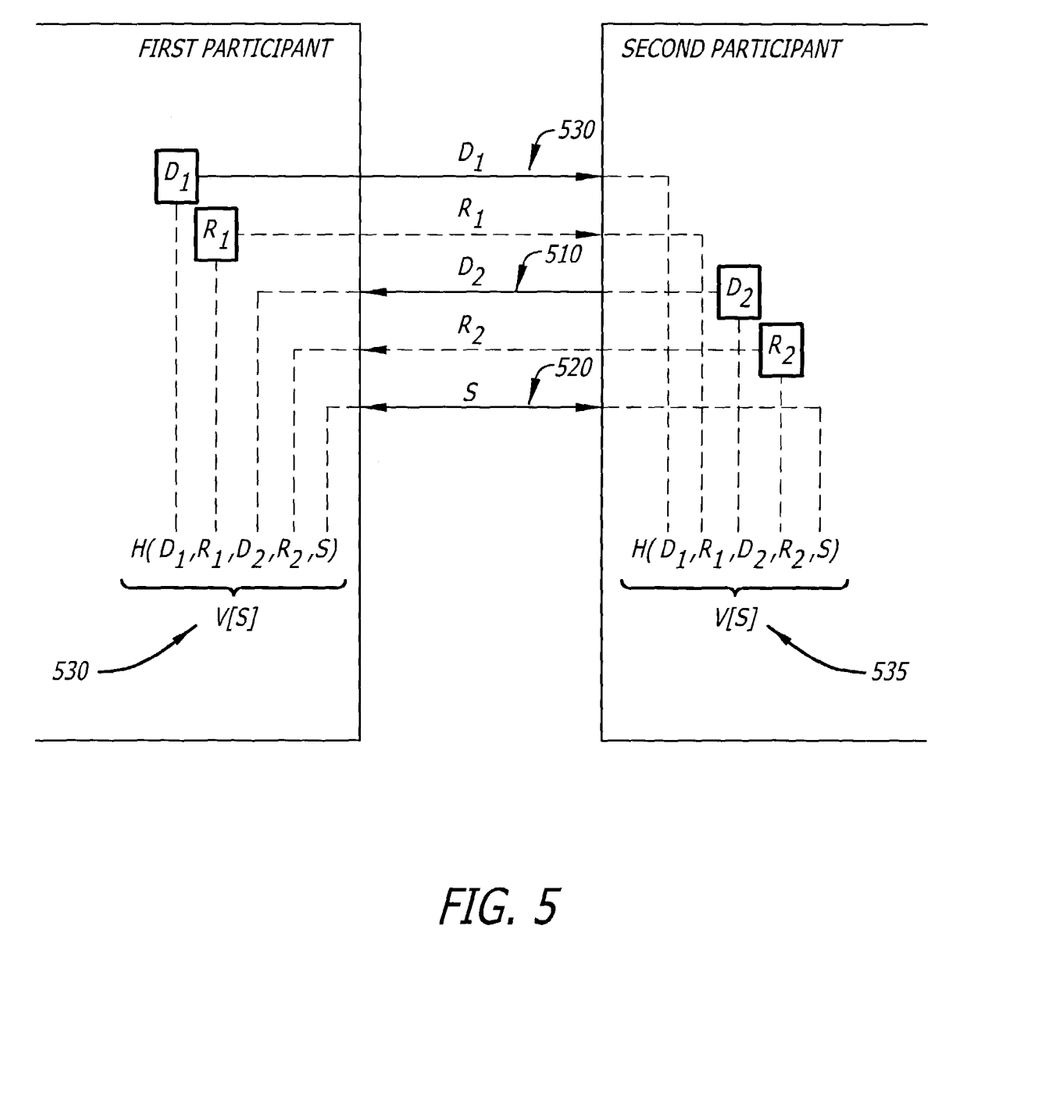
FIG. 5 is an exemplary embodiment of two participants exchanging data, inclusive of at least one data item and a nonce, for sensory verification of shared data through actions that increment or decrement a sequence number.

As an exemplary embodiment of FIG. 5, a computing unit of a first participant provides a data item ($D_1$) and a random value ($R_1$) to a second participant (block 500). The second participant provides a data item ($D_2$) and a random value ($R_2$) to the first participant (block 510). At this time, the two participants select a sequence number(s) common to all computing units (block 520). Hence, each participant is able to produce a sequence of values as follows:

v[s]=H(s, $D_1$, $R_1$, $D_2$, $R_2$), where "H( )" represents some function, such as a cryptographic hash function that produces a hash result.

For this embodiment of the invention, each sequence value v[s] may be a result of a hash function based on a particular sequence number (s) along with the exchanged data items ($D_1$, $D_2$) and optional random values ($R_1$, $R_2$). The sequence value is subsequently used to generate or select a series of sensory elements for display or playback (e.g., words, tones, chords, images, etc.) as shown in blocks 530 and 535. Successive sequence values are similarly produced after the sequence number has been incremented or decremented in response to a clocked event or completion of an action. These values are rendered on multiple devices and compared by human user sensory mechanisms, to establish whether they are the same or different.

Figure 6A:
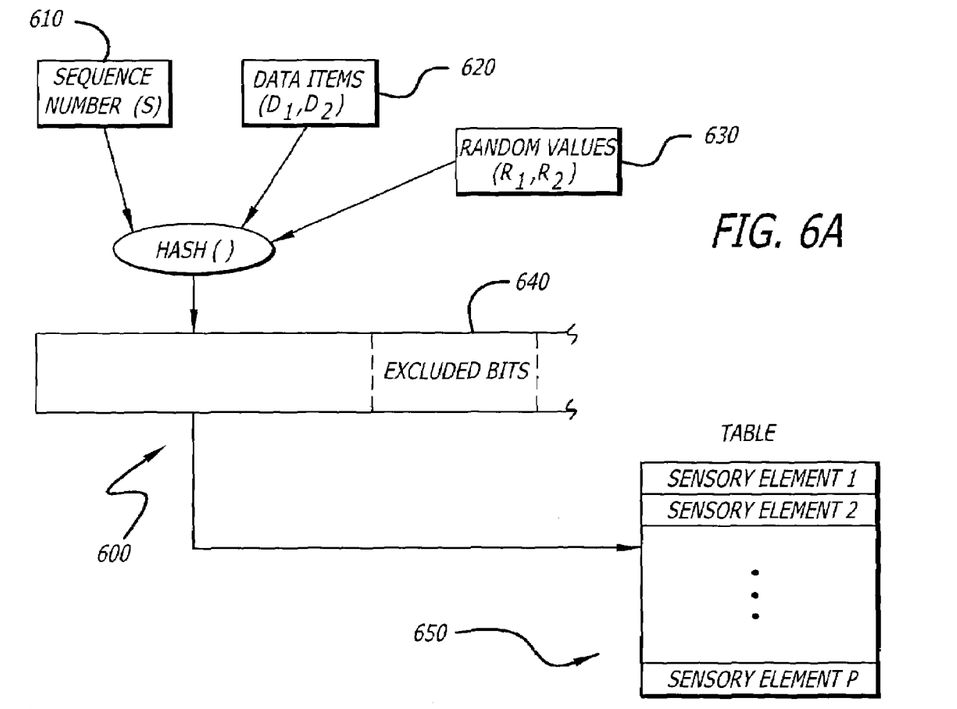
FIG. 6A is a first exemplary embodiment of operations for selecting a sensory element based on bit values obtained from a transformation result.

For instance, as shown in FIG. 6A, an exemplary embodiment of operations for selecting a sensory element based on bit values obtained from a transformation result 600 is shown. The value of the transformation result 600 is produced by a cryptographic hash operation on at least a sequence number (s) 610 and one or more data items ($D_1$, $D_2$) 620. Optionally, random values ($R_1$, $R_2$) 630 may be used in producing transformation result 600, in some cases, a value being 16 or more bits in length. It is contemplated, however, that transformation result 600 may be adapted with any bit size because some bits from the transformation result 600 may be excluded from selecting or computing a sensory element. Moreover, any bits of the transformation result may be extracted, not just the initial bits of the result 600 as shown.

Figure 6B:
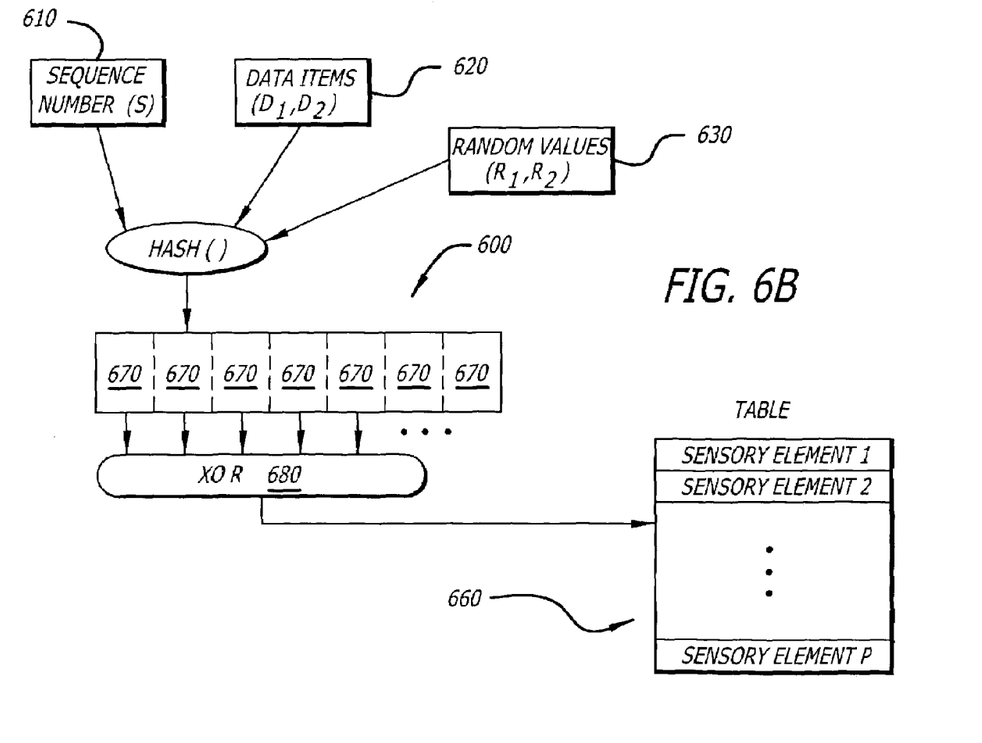
FIG. 6B is a second exemplary embodiment of operations for selecting a sensory element based on bit values obtained from a transformation result.

As shown in FIG. 6B, such reduction can be accomplished by a selection of a selected sub-field 650 of transformation result 600 for use in accessing an entry of a table 660. As shown, table 660 features $2^x$ entries. Alternatively, the reduction can be achieved by separating transformation result 600 into a number of fields 670 and performing logical operations on bits of these fields 670 to generate an address for accessing data within certain entries of table 660. For example, one type of logical operation is an Exclusive OR (XOR) 670 as shown in FIG. 6B.

Referring back to FIG. 5, the sensory elements output by the computing units are compared (block 540). During verification by sequence of values, one learns progressively more about the data item being verified with each value. With rapid timed sequence, such as visual comparisons or audio comparisons of random musical notes or chords, for example, the rate of verification is high enough that strong verification quickly occurs. Thus, there may be a need to advise the participant as to when sufficient verification has been performed such as through a progress bar as described above.

II. Generalized Sensory Verification of Shared Data

In yet another embodiment of the invention, multiple participants are enabled to exchange data items with each other. In general, the entire set of data items along with any optional random value(s) and either a sequence number or a current time value for some selected computing unit repeatedly undergo a transformation function. This produces a transformation result that is used, for verification purposes, to generate or select sensory elements for display or playback. Hence, each participant of a large group of participants (3 or more) is able to determine whether he or she has an accurate and complete copy of the data items being exchanged and has the same data as everyone else.

For instance, a collection of data such as cryptographic keys and data files may be verified contemporaneously by allowing for a period of time for participants to exchange data and to provide a verification process that allows multiple participants to compute what should be the same verification value sequence over this collection of data that should be the same, render that sequence of verification values and sense group agreement. For example, if audio means are used, one can tell whether his or her audio stream agrees with or differs from those of all other participants in a room, when all others are in agreement. If visual means are used, one participant can be selected to project his or her sensory sequence for all other participants to view and use for comparison to a locally generated sequence.

Figure 7:
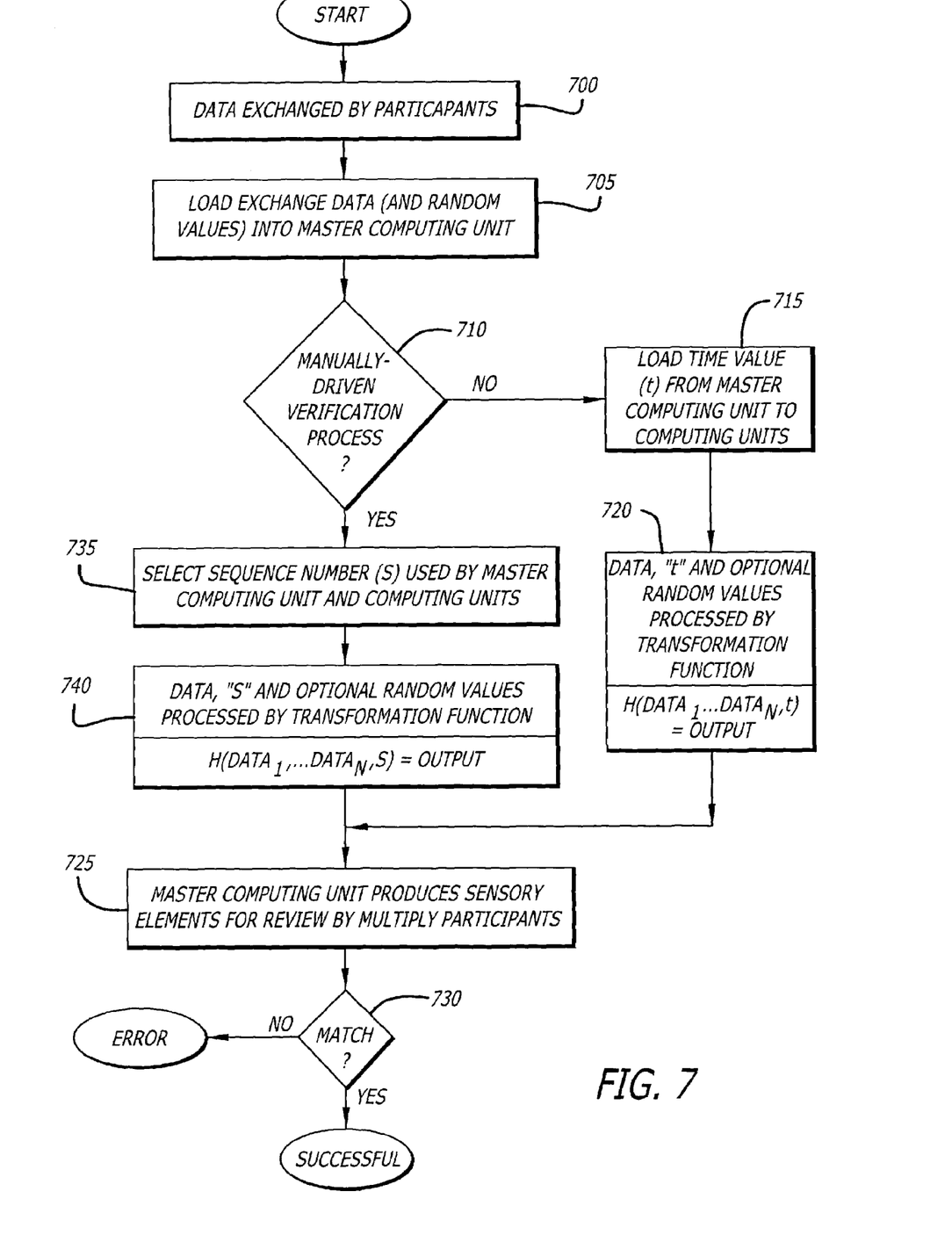
FIG. 7 is an exemplary embodiment of a flowchart outlining the operations performed in accordance with a sensory verification of shared data among multiple participants.

For instance, one of many types of verification processes is shown in FIG. 7. This exemplary process should not be construed as limiting of the invention, but merely as one illustration. During a meeting, a period of time is set aside for participants to exchange data (block 700). This can be accomplished by each computing unit broadcasting data (e.g., files, random values, nonce, keys, or other data types or combination of data types). Thereafter, the meeting transitions into a verification phase where each participant can verify that he or she has completely and accurately downloaded all of the data ($DATA_1$, ..., $DATA_N$). This can be accomplished by displaying or playing back an output of a participant's computing unit (referred to for this embodiment as the "master computing unit."

Herein, for this embodiment of the invention, a set of exchanged data and random values (if used)) are loaded into the master computing unit (block 705). A determination is made whether the verification process is clock-driven (time value, t) or manually-driven (s) (block 710). Typically, either "t" or "s" but not both, is used during the verification process. The type of transformation function "H( )" selected for the verification process supports a condition that any change in any of the data yields a change in the resultant output. Hash functions have such a characteristic, but these functions are not exclusive. Potential types of functions include SHA-1, SHA1-HMAC (with "t" and/or "s" values as the key), XOR of data and a separate function based on time value (t) or the sequence number (s) to select bits from that XOR.

For a clock-driven verification process, a time value (t) is loaded into the master computing unit (block 715). At the master computing unit, as shown in block 720, the time value (t) combined with the data are processed by a transformation function in order to convert a combination of data ($DATA_1, \ldots, DATA_N$) with dynamic datum (e.g., time value) into a resultant output as shown in block equation (2):

$$OUTPUT = H(DATA_1, \ldots, DATA_N, t), \text{ where} \quad (2)$$

"t" is the current time on some selected unit and estimated at the other units), quantized so that each unit will select the same numeric value of t for the computation. For example, these units could decide to recompute the output every 0.5 seconds, using values of t that are an integer number of half seconds.

The master computing unit produces sensory elements in succession, based on the resultant output, which is a timed-sequence for this embodiment of the invention (block 725). The sensory elements can be reviewed by three or more participants contemporaneously and determined if the successive output sensory elements matches a sequence of outputs produced by their computing units (e.g., by participants reading words to one another, going in sequence around a room). The successive sensory elements may include images such as flag representations laid out spatially on the screen of each computing unit or displayed side-by-side on the screen.

If the sensory elements match, the participant can rely that the data were transferred completely and accurately (block 730). However, if no match is determined, an error is realized by each participant.

For verification in a large group of participants, the master control unit may use a projector to display the sensory elements, being verification graphics, on a large screen to an auditorium full of participants. This would allow each participant who wants to verify the same data set to individually compare the displayed sensory elements to those displayed by the projector. Alternatively, the master control unit may use audio verification, in which the exchanged data items are used to generate audio such as a sequence of tones. Each participant having the same data will render the same tone or chord sequence. If there is one participant having different data, the recovered audio tones will stand out from the crowd and be noticeable by the participant and probably neighbors of that participant.

For a manually-driven verification process, a sequence number (s) is commonly used by the master and other computing units (block 735). At the master computing unit, as shown in block 740, the sequence number (s) combined with the data are processed by a transformation function in order to convert a combination of data ($DATA_1, \ldots, DATA_N$) with dynamic datum (e.g., sequence number) into a resultant output as shown in block equation (3):

$$OUTPUT = H(DATA_1, \ldots, DATA_N, s), \text{ where} \quad (3)$$

"s" is a sequence number of arbitrary value.

The master computing unit produces sensory elements in succession, based on the resultant output, which is a manually-driven sequence for this embodiment of the invention (block 725). The sensory elements can be reviewed by three or more participants contemporaneously and determined if the successive output sensory elements matches a sequence of outputs produced by their computing units as described above.

As a variant of the transmission of a sequence of pleasant tones, coming at a slow enough rate to make it similar to music, we generate what sounds like white noise. The audible sound constitutes sound impulses transmitted at a transmission rate of hundreds or thousands of bits per second, which is greater than the transmission rate of the sequence of notes and/or chords. Each of the participants has a headset driven by the same random sequence, only inverted so that when the local participant's sequence is in phase with the remote source, the result would be a strong diminution or cancellation of perceived sound. The participants would need a phase adjustment, since these are coming so fast that network delay alone would be enough to prevent a line-up of signals. However, once the participants have found the right phase adjustment (the right delay amount for their signal in his or her earphones) and the right amplitude, what they will hear is a reduction in sound or even silence. During that perceived silence, the participants are verifying bits at the rate at which they're being transmitted, perhaps as high as 15,000 bits/second. Thus, each participant does not need to listen very long to verify bits to cryptographic quality (160 bits).

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
exchanging at least one data item with a computing unit;
selecting a sequence number;
performing a transformation on the at least one data item and the sequence number to produce a first value of a sequence of values, the first value being a hash result used to produce a perceivable sensory element, the perceivable sensory element includes a graphic image for visual comparison with another sensory element contemporaneously produced and displayed by the computing unit;
periodically altering the sequence number; and
periodically performing transformations of the at least one data item and the altered sequence number to produce, inclusive of the first value, the sequence of values being used to produce a series of perceivable sensory elements for visual comparison with a corresponding series of sensory elements produced by the computing unit.

2. The method of claim 1, wherein the comparison of the series of perceivable sensory elements with the sensory elements produced by the computing unit are contemporaneous.

3. The method of claim 1 wherein the periodicity of the altering of the sequence number is dynamically controlled in response to a manual event.

4. The method of claim 1 wherein the periodicity of the altering of the sequence number is clock controlled.

5. The method of claim 1, wherein the performing of the transformation includes generation of the hash result based on the sequence number and the at least one data item.

6. The method of claim 1 wherein the sensory elements are graphics images.

7. The method of claim 1 further comprising performing visual comparison and auditory comparison through playing back of audio associated with the perceivable sensory element with audio associated with the sensory element produced by the computing unit.

8. The method of claim 7, wherein the audio associated with the sensory element is at least one of tones, chords or portions of musical compositions.

9. A software stored in machine-readable medium executed by internal circuitry within a first computing unit, the software comprising:
a first software module to enable an exchange of at least one data item with a second computing unit;
a second software module to perform periodic hash transformations on the at least one data item and a periodically altered sequence number to produce a sequence of hash values, each hash value being used to produce and either display or playback a perceivable sensory element differing from a display of the hash value for visual or auditory verification by a user of the first computing unit through comparison of the perceivable sensory element with a sensory element produced and either displayed or played back by the second computing unit.

10. The software of claim 9, wherein the second software module further performs the transformation on at least one random number shared between the first computing unit and the second computing unit.

11. The software of claim 9, wherein the second software periodically alters the sequence number under dynamic control based on manual events.

12. The software of claim 11, wherein the manual events include at least one of a depression of a button of the first computing unit, selection of a menu item being displayed by the first computing unit.

13. The software of claim 9, wherein the second software periodically alters the sequence number based on clock-driven events.

14. The software of claim 13, wherein the clock-driven events are based on at least one of a clock cycle and a clock value itself.

15. The software of claim 9, wherein the perceivable sensory element being a graphic image that is rendered based on a hash value of the sequence of hash values.

16. The software of claim 9, further comprising:
a third software module to display the perceivable sensory elements for visual comparison with the sensory elements produced by the second computing unit.

17. The software of claim 9, further comprising:
a third software module to play back the perceivable sensory elements for audible comparison with the sensory elements produced by the second computing unit.

18. A computing unit comprising:
a casing;
an input/output (I/O) interface;
an output component to provide sensory data for a user; and
internal circuitry contained within the casing and enabling sensory verification of shared data by controlling operations of the I/O interface and the output component, the internal circuitry to output or input at least one data item via the I/O interface, to periodically perform a cryptographic hash operation on the shared data including at least one data item and a sequence number, being periodically altered prior to performance of the cryptographic hash operation, to produce a sequence of hash values, each hash value being used to produce a perceivable sensory element differing in form from an alphanumeric hash value, for visual or auditory verification by a user of the computing unit through comparison of the perceivable sensory element with a sensory element produced by a unit other than the computing unit.

19. The computing unit of claim 18, wherein the internal circuitry includes a memory and a processor accessing information from the memory.

20. The computing unit of claim 19, wherein the internal circuitry further includes a clock circuitry to periodically alter the sequence number.

21. The computing unit of claim 18, further comprising an input device to initiate performance of the transformations in response to an action performed on the input device by the user.

22. The computing unit of claim 18, wherein the shared data further includes at least one random value.

23. The computing unit of claim 19, wherein output component is at least one speaker that playback audible sounds digitally stored in the memory.

24. A network comprising:
a second computing unit in communication with a first computing unit, the second computing unit to (i) exchange at least one verification packet including at least one data item with the first computing unit, (ii) generate a sequence of values based on the at least one data item and a periodically altered sequence number, and (iii) present, in a successive fashion, a first plurality of perceivable sensory elements each being a graphic image uniquely associated with at least one of the sequence of values; and
the first computing unit to (i) generate the sequence of values based on the at least one data item and the periodically altered sequence number, and (ii) present a second plurality of perceivable sensory elements each uniquely associated with at least one of the sequence of values for comparison with the first plurality of perceivable sensory elements.

25. The network of claim 24, wherein the at least one verification packet exchanged between the first and second computing units further comprises the sequence number, the sequence number being subsequently altered within each of the first and second computing units contemporaneously while remaining equivalent in value.

26. The network of claim 25, wherein the at least one verification packet exchanged between the first and second computing units further comprises at least one random number generated by one of the first computing unit and the second computing unit.

* * * * *